United States Patent [19]

Brachthauser

[11] 3,840,336
[45] Oct. 8, 1974

[54] MEANS FOR MOUNTING A BEARING RING ON THE SHELL OF A ROTARY TUBE
[75] Inventor: Kunibert Brachthauser, Bensberg, Germany
[73] Assignee: Klockner-Humboldt-Deutz AG
[22] Filed: June 4, 1973
[21] Appl. No.: 365,995

[30] Foreign Application Priority Data
June 6, 1972 Germany............................ 2227412

[52] U.S. Cl................................. 432/103, 308/204
[51] Int. Cl............................................. F27b 7/22
[58] Field of Search........ 432/103, 104; 308/37, 36, 308/204

[56] References Cited
UNITED STATES PATENTS
3,096,127 7/1963 Parker................................. 308/36

3,291,541 12/1966 Dellinger............................ 432/104

FOREIGN PATENTS OR APPLICATIONS
640,130 7/1950 Great Britain..................... 432/103

Primary Examiner—John J. Camby
Attorney, Agent, or Firm—Hill, Gross, Simpson, Van Santen, Steadman, Chiara & Simpson

[57] ABSTRACT

A bearing ring is mounted on a rotary tube, such as the shell of a rotary furnace or kiln, by means including bearing elements replaceably disposed between the shell and the bearing ring to permit relative movement between the bearing ring and the shell in the circumferential direction. Such bearing elements may comprise a plurality of slide plates or roller members distributed along the circumference of the shell and constrained laterally by guide members secured to the shell.

8 Claims, 5 Drawing Figures 3,840,336

MEANS FOR MOUNTING A BEARING RING ON THE SHELL OF A ROTARY TUBE

BACKGROUND OF THE INVENTION

This invention relates to means for mounting a bearing ring on the shell of a rotary tube, particularly the shell of a rotary furnace or kiln.

Large rotary tubes, particularly tubular shells of rotary furnaces or kilns, are provided with at least two bearing rings at spaced locations along the length thereof. In the region of such a bearing ring there are beneath the rotary tube bearing rollers which support the rotary tube and upon which the bearing ring rolls. It is necessary to dimension and arrange the bearing ring and the rotary shell in such a manner as to satisfy the strength requirements and also to keep deformation of the rotary shell, such as gradual distortion into more or less oval cross-section, at the support place as small as possible. Only when even in continuous operation the deformation of the rotary shell under the influence of thermal stresses remains as small as possible, is it possible to prevent damage to the shell lining, such as a fireproof ceramic lining. One way to counteract such deformation is to give the rotary shell greater wall thickness in the region of the bearing ring and to secure the bearing ring on the thus reinforced shell portion by special fastening means.

Since the rotary shell in spite of such greater wall thickness in the region of the bearing ring is comparatively easily deformable, while the bearing ring itself is substantially more rigid and, therefore, even under load better retains its circular shape, the rotary shell adapts itself in the lower region to the bearing ring, while in the upper regions in the course of time a play develops between the rotary shell and the bearing ring. Due to this distortion relative circumferential movement of the shell in the somewhat larger bearing ring bore is not possible without wear. Through wear of the initially undistorted bearing ring seat the oval shape of the rotary shell becomes gradually more pronounced in the region of the bearing ring. Since, furthermore, the deformation continuously varies circumferentially in correspondence to the rotation of the furnace, the rotary furnace shell is in said region subject to a continuously changing and constantly increasing deformation which detrimentally influences the durability of the fireproof ceramic lining in the furnace and considerably reduces the life thereof.

It has been attempted to prevent the relative movement between the bearing ring and the rotary shell. To this end the bearing ring has been crimped onto the shell or the bearing ring has been fixedly located by means of a rigid connection through rivets or interengaging teeth between the bearing ring and the rotary shell. it is true that hereby the relative movement between bearing ring and rotary shell in the circumferential direction was prevented, but the increasing deformation of the rotary shell which partially can be traced back to permanent distortions caused by the high temperatures to which the rotary shell notwithstanding the fireproof lining is subjected, could not be prevented. A frequent consequence hereof is that in the course of time the crimp fitting is loosened or that through the developing changes in geometry the rivets are broken off or the structural elements forming the teeth are broken.

In the heretofore known bearing ring fastenings there occurs therefore already after a comparatively short time such a wear of the bearing ring seat on the rotary shell that, for example, in the case of a rotary furnace the operation of the furnace is no longer sufficiently safeguarded since, on the one hand, damage to the lining develops and, on the other hand, with increasing wear the rotary shell itself becomes damaged. In order to eliminate such damage to the rotary shell extensive and expensive repair work is usually necessary which requires shut-down of the furnace. In this case the bearing ring must be removed from its seat, and frequently the entire bearing ring assembly must be removed and replaced. In addition to the high repair costs this involves also extended disruptions of the operation which in connection with the large modern installations means substantial costs.

SUMMARY OF THE INVENTION

The object of the invention is to provide means for mounting of a bearing ring on the rotary shell, particularly the shell of a rotary furnace or kiln, by means of which the abovementioned disadvantages are avoided. This problem is solved by arranging preferably exchangeable bearing elements between the bearing ring and the rotary shell, which bearing elements in operation permit movement of the bearing ring in the circumferential direction in relation to the rotary shell. In this way, the rotary shell and its interior lining are in comparison with heretofore known mountings of the bearing ring protected against damage even in the case of distortion of the rotary shell. Wear occurs in this case essentially only on the bearing elements disposed between the bearing ring and the furnace shell, and said bearing elements can, if need be, very easily and rapidly be replaced by1new bearing elements. by new addition, in connection with such replacement consideration can to a great extent be paid to signs of distortion and wear and thereby the play between the bearing ring and the rotary shell can largely be kept constant.

In an advantageous further development of the invention the bearing elements comprise a plurality of loose plates uniformly distributed along the circumference of the shell and guided laterally by guide members. The slide plates are maintained accurately in their intended path by the guide members. Furthermore, said slide plates may very advantageously be removed laterally through suitable apertures in one of the guide members and replaced by new slide plates. The substitution of new slide plates for the worn ones can in this manner be accomplished in comparatively short time.

In another advantageous embodiment of the invention the bearing elements comprise a plurality of roller members uniformly distributed on the rotary shell. The life of such roller members is longer than that of slide plates and the wear is correspondingly less.

In order to promote the relative movement of the bearing ring on the rotary shell and to keep the wear, particularly in the case of slide plates, to a minimum the bearing ring and/or the lateral guide members are in a further advantageous development of the invention provided with lubrication channels for the supplying of lubricants.

Further objects, features and advantages of the invention are explained in greater detail with reference

DETAILED DESCRIPTION OF A PREFERRED EMBODIMENT

Figure 1:
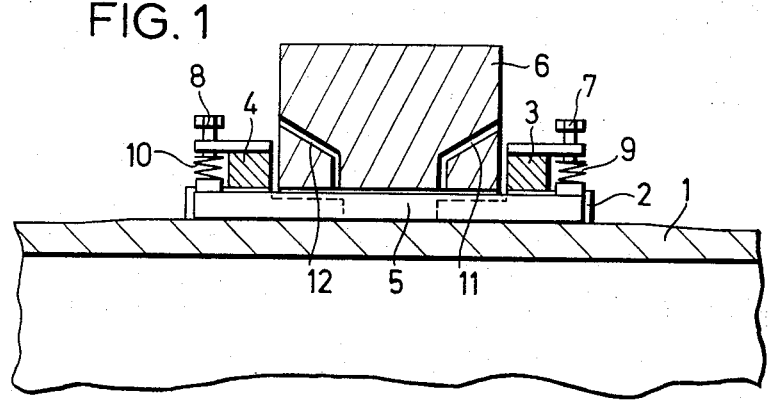
FIG. 1 is a partial section of an embodiment of the invention in a plane containing the longitudinal axis of the tubular shell.
Figure 2:
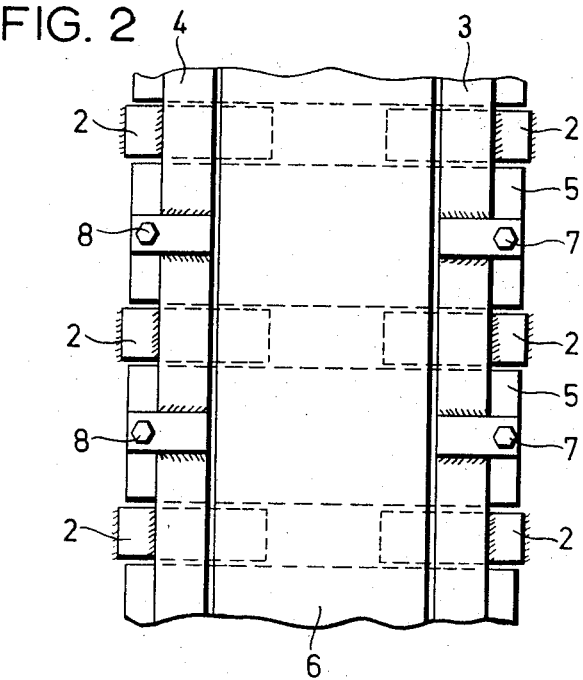
FIG. 2 is a plan view of the embodiment shown in FIG. 1.

In FIGS. 1 and 2 a tubular shell 1, forming part of a rotary furnace or kiln, has in the bearing region a section of increased wall thickness. On this reinforced portion of the shell 1 guide means 2 are welded to the shell at circumferentially spaced intervals, and with said guide means 2 annular guide members 3, 4 are connected in any suitable way. Between the guide means 2 there are disposed a number of slide plates 5 distributed circumferentially of the shell 1, and on said slide plates 5 a bearing ring 6 is arranged with a small clearance so that said bearing ring 6 is movable on the slide plates 5 in relation to the shell 1 in the rotary direction. The guide members 3, 4 serve to constrain the bearing ring 6 against lateral movement on the slide plates 5. The slide plates 5 are forced against the shell 1 by means of screws 7, 8 and springs 9, 10 and maintained in this position. The bearing ring 6 is provided with lubrication channels 11, 12 through which lubricant is supplied from the outside to the clearance space between the inner surface of the bearing ring 6 and the outer surfaces of the slide plates 5.

In operation of the tubular shell the bearing ring 6 is movable on the slide plates 5 in the rotary direction relatively to the shell 1. As the slide plates 5 are maintained in position between the guide means 2 by means of the screws 7, 8 and springs 9, 10, wear occurs only on the bearing ring 6 and the slide plates 5. In order to keep said wear as small as possible lubricant is from time to time supplied through the lubrication channels 11, 12 to the clearance space between the inner surface of the bearing ring 6 and the outer surfaces of the slide plates 5. Furthermore, the wear on the bearing ring 6 may also be reduced by the use of slide plates 5 made of a material which is less hard than that of the bearing ring 6 and therefore more rapidly worn.

When the slide plates 5 have been worn, the screws 7, 8 are loosened and the slide plates are pulled out in the longitudinal direction of the shell 1. Upon removal of the worn slide plates new slide plates are inserted laterally between the guide means 2 and the screws 7, 8 are again tightened to press said new slide plates against the shell 1. The particular advantage of the arrangement of slide plates 5 between the shell 1 and the bearing ring 6 according to the invention is not limited to the fact that the slide plates 5 are very easily and rapidly exchangeable but includes also the fact that in case of deformation of the shell 1 correspondingly thicker or thinner slide plates may be used and inserted as needed, so that thereby an annular clearance space of uniform width over the entire circumference can be established and maintained between the inner surface of the bearing ring 6 and the outer surfaces of the slide plates 5. In this manner it is also achieved that in case of deformation of the shell 1 due to thermal stresses or the like an all-round and uniform slide movement of the shell 1 is obtained, whereby the shell 1 is positively maintained free from wear. This also has a very favorable effect on the life of the rotary shell and the durability of its inner lining in the case of rotary tubular furnaces.

Figure 3:
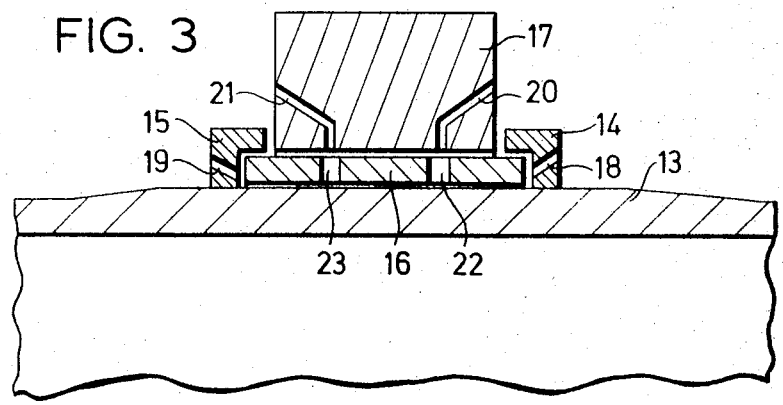
FIG. 3 is a partial section similar to FIG. 1 of another embodiment of the invention.
Figure 4:
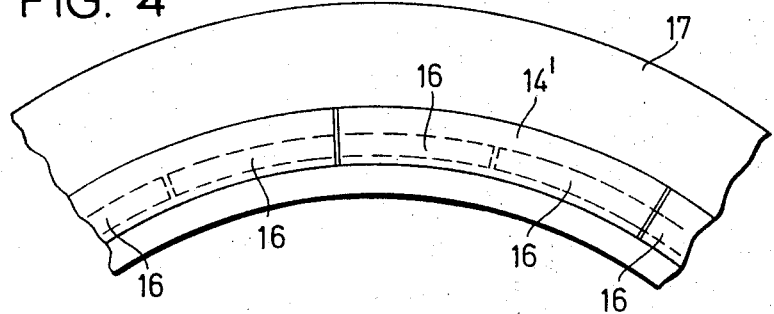
FIG. 4 is a partial transverse elevation view of the embodiment shown in FIG. 3.

In FIGS. 3 and 4 the bearing elements comprise a plurality of loose slide plates 16 which are uniformly distributed over the circumference of a rotary shell 13 and supported laterally by means of guide members 14, 15. In this embodiment both the lateral guide members 14, 15 and the bearing ring 17 between said guide members 14, 15 are provided with lubrication channels 18, 19 and 20, 21, respectively. The slide plates 16 are also provided with openings 22, 23 through which lubricant may pass into the space between the outer surface of the shell 13 and the bottom surfaces of the slide plates 16. The adjoining slide plates 16 may in this way be provided with lubricant all around, whereby friction between the slide plates 16 and the shell 13, on the one hand, and the slide plates 16 and the bearing ring 17, on the other hand, is significantly decreased. In order to render it possible to rapidly replace the worn slide plates 16 at least one of the guide members 14, 15 is provided with a removable segment 14' which may be connected with the remainder of the guide members through a simple screw connection or the like.

The embodiment of FIGS. 3 and 4 provides with regard to wear and durability of the shell 13 the same advantages as the embodiment shown in FIGS. 1 and 2.

Figure 5:
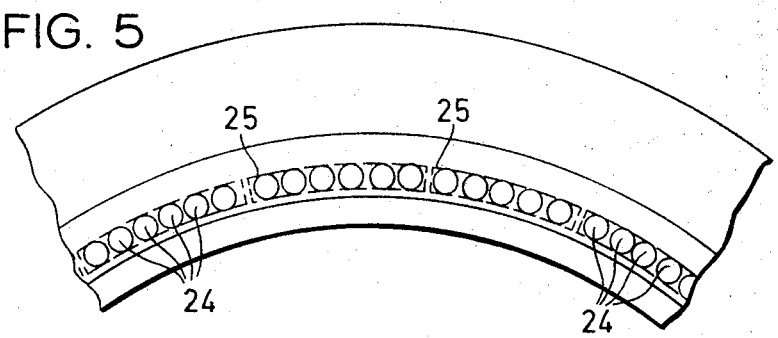
FIG. 5 is a view similar to FIG. 4 of an embodiment of the invention in which the bearing elements comprise a plurality of roller members.

Instead of slide plates it is feasible, as shown in FIG. 5, to use as bearing elements a plurality of roller members 24 which are uniformly distributed on the circumference of the shell 13. In this case it is very advantageous to combine a number of the roller members 24 in a cage 25 to form a roller unit since thereby the risk is avoided that single rollers during the operation assume slanted or oblique positions. The rollers 24 assembled into cages 25 are in operation maintained and guided in their intended paths by means of lateral guide members in a similar manner as the slide plates 6 of FIGS. 3 and 4.

Through the arrangement shown in FIG. 5 the bearing ring 17 moves circumferentially on the shell in a manner similar to the function of a roller bearing. The roller members 24 have in comparison with the slide plates the advantage that due to their rolling movement they are not as rapidly worn as the slide plates. Accordingly, the rollers 24 do not have to be exchanged or replaced as frequently as the slide plates. The exchange of worn rollers or roller units is accomplished in a manner similar to the exchange of worn slide plates by removal of a section of guide member and lateral pulling-out of the worn rollers and insertion of corresponding new rollers or roller units. The supplying of rollers with lubricant takes place through lubricant channels in the bearing ring and/or in the lateral guide members.

The invention is not limited to the preferred embodiments illustrated in the drawings. For example, if considered advantageous, slide plates and rollers may be used in combination with each other as bearing elements.

I claim as my invention:

1. Means for mounting a bearing ring on the shell of a rotary tube, particularly the shell of a rotary furnace of kiln, comprising bearing elements replaceably disposed between said bearing ring and said shell to permit relative movement between said bearing ring and said shell in the circumferential direction, and guide means provided with lubrication channels and being secured to said shell laterally of the bearing ring, at least one of said guide means including at least one removable section.

2. Means for mounting a bearing ring on the shell of a rotary tube, particularly the shell of a rotary furnace or kiln, comprising bearing elements replaceably disposed between said bearing ring and said shell to permit relative movement between said bearing ring and said shell in the circumferential direction, said bearing ring being provided with lubrication channels.

3. In a rotary furnace, kiln and the like comprising a tubular shell with at least one rigid annular bearing ring encircling said tubular shell and supporting the same for rotary motion about the longitudinal axis of the shell, the improvement which includes a plurality of individual bearing elements circumferentially distributed between the outside of the shell and the inner surface of the bearing ring, and guide means connected to said shell adapted to constrain lateral movement of said bearing elements and bearing ring longitudinally of the shell, at least one circumferential section of said guide means being removable to permit removal and replacement of said bearing elements individually through the lateral opening created by the removal of said section of the guide means, whereby contour distortions of the shell and wear of the bearing elements may be easily and rapidly compensated for without prolonged disruptions of the operation of the furnace, kiln and the like.

4. The structure according to claim 3, in which said bearing elements comprise a plurality of slide plates uniformly distributed along the circumference of said tubular shell.

5. The structure according to claim 3, in which said bearing elements comprise a plurality of roller members uniformly distributed along the circumference of said tubular shell.

6. The structure according to claim 5, in which a number of said roller members are combined in a cage to form a separate roller unit.

7. The structure according to claim 3, in which said bearing ring is provided with lubrication channels for supplying lubricant to said bearing elements.

8. The structure according to claim 3, in which said guide means are provided with lubrication channels for supplying lubricant to said bearing elements.

* * * * *